US010800864B2

(12) United States Patent
Sumerin et al.

(10) Patent No.: US 10,800,864 B2
(45) Date of Patent: *Oct. 13, 2020

(54) PROCESS FOR PRODUCING POLYETHYLENE

(71) Applicant: BOREALIS AG, Vienna (AT)

(72) Inventors: Victor Sumerin, Helsinki (FI); Joseph Thorman, Helsinki (FI); Jani Aho, Helsinki (FI); Markku Vahteri, Poorvo (FI); Ravindra Tupe, Mumbai (IN); Jarmo Kela, Poorvo (FI)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,690

(22) Filed: Jun. 12, 2019

(65) Prior Publication Data

US 2019/0292284 A1 Sep. 26, 2019

Related U.S. Application Data

(63) Continuation of application No. 15/548,882, filed as application No. PCT/EP2016/052354 on Feb. 4, 2016, now Pat. No. 10,364,310.

(30) Foreign Application Priority Data

Feb. 5, 2015 (EP) .................................... 15153922

(51) Int. Cl.
*C08F 210/16* (2006.01)
*C08L 23/16* (2006.01)

(52) U.S. Cl.
CPC ............ *C08F 210/16* (2013.01); *C08L 23/16* (2013.01)

(58) Field of Classification Search
CPC .... C08F 210/16; C08F 4/6465; C08F 4/6492; C08F 4/6555; C08F 2/001; C08F 210/14;
(Continued)

(56) References Cited

U.S. PATENT DOCUMENTS 3,242,150 A  3/1966 Scoggin et al.
3,324,093 A  6/1967 Alleman et al.
(Continued)

FOREIGN PATENT DOCUMENTS

CN  103304869 A  9/2013
EP     188125 A2  7/1986
(Continued)

OTHER PUBLICATIONS

International Search Report and Written Opinion dated May 23, 2016, from International Application No. PCT/EP2016/052354, 11 pages.

*Primary Examiner* — William K Cheung
(74) *Attorney, Agent, or Firm* — Meunier Carlin & Curfman LLC

(57) ABSTRACT

The present invention relates to a process for producing ethylene copolymers in a multistage process comprising at least one slurry phase polymerization stage and at least one gas phase polymerization stage in the presence of Ziegler Natta catalyst comprising a solid catalyst component, a cocatalyst of a compound of group 13 metal and an external additive selected from alkoxysilanes of formula (I) $R^1_n Si(OR^2)_{4-n}$, (I) where n is an integer 0 to 3, each $R^1$ are equal or different and are selected among H, halogen, alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the R'groups can form with the Si atom they are linked to a ring of 3 to 8 ring atoms, (Continued)

provided that all $R^1$ are not hydrogen, $R^2$ are equal or different and are selected among alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the $OR^2$ groups can form with the Si atom they are linked to a ring of 3 to 8 ring atoms, halogen is Br, Cl or F. The invention further relates to the catalysts and use thereof in said multistage process r for producing ethylene copolymers having melt flow rate ratio $FRR_{21/5}$ at least 40 and/or polydispersity index PDI of at least 27.

11 Claims, 2 Drawing Sheets

(58) Field of Classification Search
CPC .............. C08F 2500/04; C08F 2500/12; C08F 2500/07; C08L 23/16
USPC .................................. 428/35.7, 336; 427/489
See application file for complete search history.

(56) References Cited

U.S. PATENT DOCUMENTS

| | | | |
|---|---|---|---|
| 3,374,211 | A | 3/1968 | Stanley et al. |
| 3,405,109 | A | 10/1968 | Rohlfing |
| 4,532,311 | A | 7/1985 | Fulks et al. |
| 4,543,399 | A | 9/1985 | Jenkins, III et al. |
| 4,547,552 | A | 10/1985 | Toyota et al. |
| 4,562,173 | A | 12/1985 | Terano et al. |
| 4,578,879 | A | 4/1986 | Yokoyama et al. |
| 4,582,816 | A | 4/1986 | Miro |
| 4,621,952 | A | 11/1986 | Aronson et al. |
| 4,803,251 | A | 2/1989 | Goode et al. |
| 4,855,370 | A | 8/1989 | Chirillo et al. |
| 4,927,797 | A | 5/1990 | Ewen |
| 4,933,149 | A | 6/1990 | Rhee et al. |
| 5,026,795 | A | 6/1991 | Hogan |
| 5,055,535 | A | 10/1991 | Spitz et al. |
| 5,391,654 | A | 2/1995 | Ahvenainen et al. |
| 10,364,310 | B2 * | 7/2019 | Sumerin ............ C08L 23/0815 |
| 2007/0093621 | A1 | 4/2007 | Meier et al. |
| 2008/0171162 | A1 * | 7/2008 | Weikart ................ C08J 7/0427 428/35.7 |

FOREIGN PATENT DOCUMENTS

| | | |
|---|---|---|
| EP | 250169 A2 | 12/1987 |
| EP | 0303704 A1 | 2/1989 |
| EP | 376936 A2 | 7/1990 |
| EP | 428054 A1 | 5/1991 |
| EP | 479186 A2 | 4/1992 |
| EP | 499759 A1 | 8/1992 |
| EP | 560035 A1 | 9/1993 |
| EP | 579426 A1 | 1/1994 |
| EP | 600414 A1 | 6/1994 |
| EP | 688794 A1 | 12/1995 |
| EP | 721798 A2 | 7/1996 |
| EP | 810235 A2 | 12/1997 |
| EP | 699213 B1 | 2/1998 |
| EP | 0684871 | 5/1998 |
| EP | 707513 B1 | 9/1998 |
| EP | 891990 A2 | 1/1999 |
| EP | 1310295 A1 | 5/2003 |
| EP | 1415999 A1 | 5/2004 |
| EP | 1591460 A1 | 11/2005 |
| EP | 696293 B2 | 6/2009 |
| EP | 2738211 A1 | 6/2014 |
| EP | 2738212 A1 | 6/2014 |
| WO | 9212182 A1 | 7/1992 |
| WO | 9425495 A1 | 11/1994 |
| WO | 9618662 A1 | 6/1996 |
| WO | 9619503 A1 | 6/1996 |
| WO | 9632420 A1 | 10/1996 |
| WO | 9951646 A1 | 10/1999 |
| WO | 0026258 A1 | 5/2000 |
| WO | 0029452 A1 | 5/2000 |
| WO | 0105845 A1 | 1/2001 |
| WO | 0155230 A1 | 8/2001 |
| WO | 0238624 A1 | 5/2002 |
| WO | 03106512 A2 | 12/2003 |
| WO | 2004055065 A1 | 7/2004 |
| WO | 2005058982 A1 | 6/2005 |
| WO | 2005/087361 | 9/2005 |
| WO | 2005118655 A1 | 12/2005 |
| WO | 2006063771 A1 | 6/2006 |
| WO | 2007025640 A1 | 3/2007 |
| WO | 2007051607 A1 | 5/2007 |
| WO | 2009027270 A1 | 3/2009 |
| WO | 2013113797 A1 | 8/2013 |
| WO | 2014102813 A1 | 7/2014 |

* cited by examiner

PROCESS FOR PRODUCING POLYETHYLENE

This application is a continuation of U.S. application Ser. No. 15/548,882 filed on Aug. 4, 2017, which is a National Stage of PCT International Application No. PCT/EP2016/052354, filed Feb. 4, 2016, and claims priority from European Patent Application No. 15153922.8, filed Feb. 5, 2015, the contents of which are incorporated herein by reference in their entireties.

This invention relates to a process for producing ethylene polymers in a multistage process and in the presence of Ziegler Natta catalyst comprising a solid catalyst component, Group 13 metal compound as cocatalyst and an external additive. The invention further concerns said catalysts and their use in producing ethylene polymers with desired properties.

BACKGROUND OF THE INVENTION

Ziegler-Natta (ZN) type catalysts are well known in the field of producing polymers from olefinic monomers, like ethylene (co)polymers. Generally the catalysts comprise at least a catalyst component formed from a transition metal compound of Group 4 to 6 of the Periodic Table (IUPAC, Nomenclature of Inorganic Chemistry, 1989), a metal compound of Group 1 to 3 of the Periodic Table (IUPAC), and, optionally, a compound of group 13 of the Periodic Table (IUPAC) and/or optionally an internal organic compound, like an internal electron donor compound. The ZN catalyst may also comprise further catalyst component(s), such as cocatalyst(s) and optionally external additives, like external donors.

A great variety of Ziegler-Natta catalysts have been developed to fulfill the different demands in reaction characteristics, large-scale production, and producing poly(alpha-olefin) resins of desired physical performance. One type of a typical Ziegler-Natta catalyst component is preferably comprised of a magnesium compound, an aluminium compound and a titanium compound supported on a particulate support. The particulate support can be an inorganic oxide support, such as silica, alumina, titania, silica-alumina and silica-titania, typically silica.

The catalyst component can be prepared by sequentially contacting the carrier with the above mentioned compounds, as described, for example in EP 688794 and WO 99/51646. Alternatively, it can be prepared by first preparing a solution from the components and then contacting the solution with a carrier, as described in WO 01/55230.

Another group of typical Ziegler—Natta catalysts are based on magnesium dihalide, typically $MgCl_2$, that contain a titanium compound and optionally a Group 13 compound, for example, an aluminium compound. Such catalysts are disclosed, for instance, in EP376936, WO 2005/118655 and EP 810235.

The above described ZN-catalysts are described to be useful in olefin polymerisation, i.e. for producing ethylene (co)polymers.

However, even though many catalysts of prior art show satisfactory properties for many applications, there has been a need to modify and improve the properties and performance of the catalysts to achieve desired polymer properties and to have catalysts with desired performance in desired polymerisation processes.

Adding various molecules, such as internal organic compounds or external additives can influence the polymerization character of the catalyst and thereby the subsequent polymer properties. The internal organic compounds can be internal electron donors or other compounds having influence on the performance of the catalyst. An example of external additives is external electron donors. In the present application, the phrases external electron donor and external additive are interchangeable, and also internal electron donor and internal organic compound are interchangeable.

U.S. Pat. No. 5,055,535 discloses a method for controlling the molecular weight distribution (MWD) of polyethylene homopolymers and copolymers using a ZN catalyst comprising an electron donor selected from monoethers (e.g. tetrahydrofuran). The monoether, which is tetrahydrofuran in this case, is added to the catalytic component with the cocatalyst, at the latest, upon commencement of the polymerisation reaction, and is further characterised that under no circumstance should the monoether be brought into contact with the catalytic component without the presence of the cocatalyst in the medium.

WO2005058982 discloses a two-stage gas-phase polymerisation process for producing high density polyethylene (HDPE) in the presence of a solid Ziegler-Natta catalyst component and alkylaluminum compound as cocatalyst. Further, an external donor is added into the second gas phase reactor so that the disclosed process is then capable of producing a relatively broad molecular weight ethylene copolymer in the presence of a Ziegler-Natta catalyst capable of retaining at the same time good hydrogen sensitivity and a capability to homogeneously distribute the comonomer. Said external donor can be the same or different to the optional internal donor, and is preferably an ether, like tetrahydrofuran (THF). Alkoxysilanes are also listed among other external donors, such as alcohols, glycols, ketones, amines, amides and nitriles. The catalyst productivity is not discussed or disclosed, nor is any problem relating to the production of high Mw ethylene (co)polymer. In WO2005058982 it is only discussed the possible negative impact of external donors on the hydrogen response and consequently on the activity of the catalyst in the polymerization step, where the relatively low molecular weight the polymer is produced. However, producing high Mw ethylene (co)polymer good hydrogen response of the catalyst and/or substantial hydrogen carry-over from the reactor in which the relatively low molecular weight polymer is produced can cause problems. Moreover, it is generally known in the art that not each and every external additive improves comonomer distribution.

WO 2007051607 A1 suggests the possibility of producing a multimodal ethylene polymer by using alkyl ether type internal electron donors to modify the ZN catalyst component. The final molecular weight distribution (MWD) is narrower due to the reduction of MWD of a higher molecular weight (HMW) component. The electron donor is preferably tetrahydrofuran.

The use of alkoxysilanes as external electron donors with respect to polymerization of $\alpha$-olefins, particularly, with respect to polymerization of propylene for increasing stereo-regularity/tacticity by Ziegler-Natta catalysts is commonly known in the field and is widely used in the industry, as described, for example, in U.S. Pat. Nos. 4,547,552, 4,562,173, 4,927,797, WO03106512, and EP0303704. In addition to stereo-regularity/tacticity control also other properties of the final propylene polymer may be affected by use of an external electron donor.

Alkoxysilane type external donors are not commonly used nor widely presented in patent literature in ethylene (co) polymerization. However, WO200238624 discloses that use of specific alkoxysilanes together with a haloalkane compound in ethylene polymerization in the presence of cocatalyst and a very specific solid titanium catalyst component results in PE with narrow molecular weight distribution and high bulk density with high activity. WO200238624 does not discuss polymerisation in a multistage polymerisation process or polymerisation in a gas phase reactor. All polymerisation examples describe one-step liquid-phase polymerizations.

WO2004055065 discloses a solid catalyst component comprising Ti, Mg, halogen and electron donor in specific molar ratios for the preparation of copolymers of ethylene with α-olefins, where said α-olefins are homogeneously distributed along the polymer chain. Said catalyst is used in preparing linear low density PE. The electron donor (ED) is preferably an ether, like tetrahydrofuran. The catalyst component, as defined, is used in polymerisation reactions together with an alkylaluminum compound and optionally with an external electron donor. The optional external electron donor is said to be equal to or different from the ED used in catalyst component. It can also be selected from silicon compounds of formula $R_aR_bSi(OR)_c$, especially cyclohexyltrimethoxysilane, t-butyltrimethoxysilane and thexyltrimethoxysilane. The polymerization process of WO2004055065 comprises an optional pre-polymerisation step followed by a gas phase polymerization step. CN103304869 discloses a multimodal PE composition for pipes having density of 0.935 to 0,945 g/cm³ and comprising three components 1) ethylene homopolymer (40-60 wt-%) with density more than 0.970 g/cm³ and melt flow rate 5 ($MFR_5$) of more than 300 g/10 minutes, 2) ethylene-α-olefin copolymer (30-40 wt-%) with density of not greater than 0.935 g/cm³ and $MFR_5$ of not greater than 1 g/10 minutes and 3) ethylene-α-olefin copolymer (5-30 wt-%) with density less than 0.935 g/cm³ and $MFR_5$ of not greater than 0.01 g/10 minutes. Each component has narrow molecular weight distribution (Mw/Mn) of less than or equal to 5 and comonomer content of 0.2-0.7 mol-%. This composition is prepared in the presence of a Ziegler-Natta catalyst and dimethoxydiphenlysilane or cyclohexyldimethoxysilane as external donor in a multistage process comprising only slurry reactors. No information of catalyst productivity is given.

WO2013/113797 discloses similar type of multimodal PE composition as CN103304869 above having a low molecular weight ethylene polymer component and two higher molecular weight ethylene copolymer components. Polymer is produced in slurry polymerisation reactors, although other reactor types are also generally mentioned. However, no external donors are used.

WO2014102813 discloses a heterogeneous Ziegler-Natta catalyst system comprising a titanium procatalyst with a magnesium compound as a base, and at least one cocatalyst comprising at least one organoaluminium compound, a hydrocarbon medium and at least one external donor comprising at least one organosilane compound. The catalyst system is obtained by adding said organoaluminium compound and organosilane compound to the procatalyst system. The catalyst system is used for producing UHMWPE (ultrahigh molecular weight polyethylene). The polymerisation process is a one-step polymerisation.

WO2009/027270 discloses a catalyst for ethylene polymerisation comprising a solid catalyst component comprising titanium, magnesium and halogen, an aluminum alkyl cocatalyst and a silane compound. Narrow molecular weight distribution is desired indicated by FRR21/2 ratio at most 30. Use of the catalyst for producing multimodal polymer or use in a multistage process is not discussed.

Although much development work in Ziegler-Natta catalyst has been done there is still room for improvement. If specific polymer properties or specific polymerisation processes or combinations thereof are desired, catalysts of prior art do not serve as appropriate catalysts as such, but modifications and adjustments are needed in order to get polymer with desired properties and to produce said polymers with good polymerization productivity.

One method to allow the production of multimodal ethylene (co)polymers with high molecular weight fraction and broad molecular weight distribution (MWD) in a multistage process is to reduce or exclude the introduction of hydrogen as a molecular weight controlling agent to at least one of the polymerisation stages or reactors. However, if the relatively low molecular weight (co)polymer is produced in the stage before the stage, where the relatively high molecular weight copolymer is produced, it results, due to substantial hydrogen carry-over, in a relatively high hydrogen concentration in the reactor, where the relatively high molecular weight copolymer should be produced. Moreover, to provide polymer with good processability and improved flow properties, multimodal polymers with a smaller proportion of the high molecular weight fraction are often desired. However, this in turn results easily in a relatively low ethylene concentration/partial pressure and therefore higher $H_2/C_2$ molar ratios, in the reactor, where the relatively high molecular weight copolymer is to be produced. If ethylene (co)polymers with high molecular weight fraction are desired, and the amount of hydrogen has already been minimized, then external additives are added to the first polymerization stage. However, in that case, the problem is that polymers are often produced at the expense of the catalyst productivity. Further, in producing polyethylene in a multistage process comprising at least two stages one problem that is often encountered with the prior art ZN-catalysts is that it is difficult to produce an ethylene homo- or copolymer having broad molecular weight distribution (MWD) (i.e. having melt flow rate ratio $FRR_{21/5} \geq 40$ and/or polydispersity index PDI≥27) and at the same time keep productivity at a high level. I.e. in a beneficial process all the desired beneficial polymer properties should not be obtained at the expense of the overall catalyst productivity.

SUMMARY OF THE INVENTION

Accordingly, the present invention provides a process for producing ethylene copolymer with desired properties. The present invention provides a multistage process for preparing a multimodal ethylene copolymer with high molecular weight and broad molecular weight distribution. It provides a process for producing multimodal polyethylene in a process comprising at least two polymerisation stages, where at least one stage is carried out in a slurry phase and at least one stage is carried out in gas phase in the presence of a Ziegler-Natta catalyst comprising an external additive. Further, the invention provides a process, where the molecular weight of the polymer produced in the second stage can be increased without negatively affecting the catalyst productivity. This is possible by overcoming limitations in hydrogen response of the catalyst and/or hydrogen carry-over from the reactor in which the relatively low molecular weight (co)polymer is produced.

Further, the present invention provides a Ziegler-Natta catalyst comprising a solid catalyst component, a cocatalyst and an external additive as defined later in the present specification and which catalyst is suitable for producing ethylene polymers with desired properties in a multistage polymerisation process comprising at least one stage carried out in a slurry phase and at least one stage carried out in gas phase.

Further, one object of the invention is to use the catalyst in accordance with the present invention in the process for producing polyethylene, especially for producing ethylene copolymer in a multistage process, especially in a multistage process comprising at least one slurry phase reactor and at least one gas phase reactor.

DETAILED DESCRIPTION OF THE INVENTION

The present invention provides a multistage process comprising at least one slurry phase polymerization stage and at least one gas phase polymerization stage for producing ethylene copolymers comprising the steps of (a1) introducing ethylene, optionally hydrogen and optionally alpha-olefin comonomer having from 4 to 10 carbon atoms into an optional polymerisation stage A1 in the presence of a solid catalyst Ziegler-Natta component, a cocatalyst and optionally an external additive, (b1) maintaining said polymerisation stage in such conditions as to produce an ethylene homo- or copolymer product P-A1

(a2-i) feeding ethylene, the polymerisation product P-A1, optionally alpha-olefin comonomer having from 4 to 10 carbon atoms and optionally an external additive to a polymerisation stage A2, or (a2-ii) feeding ethylene, a solid catalyst Ziegler-Natta component, a cocatalyst, optionally alpha-olefin comonomer having from 4 to 10 carbon atoms and optionally an external additive to a polymerisation stage A2

(b2) maintaining said polymerisation stage A2 in such conditions as to produce a lower molecular weight (co)polymer P-A2 or a (co)polymer mixture P-M1 comprising the optional ethylene (co)polymer P-A1 and the lower molecular weight ethylene (co)polymer P-A2, (c) feeding the polymerisation product P-A2 or the (co) polymer mixture P-M1, additional ethylene and an alpha-olefin comonomer having from 4 to 10 carbon atoms, an external additive, which can be the same or different as the optional external additive in step (a1) or (a2), optionally hydrogen and optionally additional cocatalyst to the polymerisation stage B (d) maintaining said polymerisation stage B in such conditions as to produce a higher molecular weight polymerisation product P-B, (e) recovering the polymerisation product P-B from the polymerisation stage B, wherein the external additive has formula (I)

$$R^1{}_n Si(OR^2)_{4-n}, \quad (I)$$

where n is an integer 0 to 3, each $R^1$ are equal or different and are selected among hydrogen, halogen, alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the $R^1$ groups can form with the Si atom they are linked to a ring of 3 to 8 ring atoms, provided that all $R^1$ are not hydrogen, $R^2$ are equal or different and are selected among alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the $OR^2$ groups can form with the Si atom they are linked to a ring of 3 to 8 ring atoms, halogen is Br, Cl or F, and wherein the polymerization stage B is a gas phase polymerization stage.

The final polymer has preferably the melt flow rate ratio $FRR_{21/5}$ of at least 40 and/or polydispersity index PDI of at least 27.

Thus, the present invention provides a process for producing ethylene copolymers having melt flow rate ratio $FRR_{21/5}$ of at least 40 and/or PDI of at least 27 according to steps a) to e) as disclosed above.

More preferably the ethylene copolymers produced according to the process of the invention have melt flow rate ratio $FRR_{21/5}$ of at least 40 and PDI of at least 27.

Further, the present invention provides a Ziegler-Natta catalyst (C) comprising i-1) a solid supported Ziegler-Natta catalyst component comprising a compound of Group 4 to 6 metal, optionally an aluminium compound, optionally an internal organic compound and a magnesium compound supported on an inorganic oxide support or i-2) a solid supported Ziegler-Natta catalyst component comprising a compound of Group 4 to 6 metal, optionally an aluminium compound and optionally an internal compound supported on a $MgCl_2$ based support, ii) a cocatalyst of Group 13 metal compound and iii) an external additive of formula (I)

$$R^1{}_n Si(OR^2)_{4-n}, \quad (I)$$

where n is an integer 0 to 3, each $R^1$ are equal or different and are selected among H, halogen, alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the $R^1$ groups can form with the Si atom they are linked to a ring of 3 to 8 ring atoms, provided that all $R^1$ are not hydrogen, $R^2$ are equal or different and are selected among alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the $OR^2$ groups can form with the Si atom they are linked to a ring of 3 to 8 ring atoms, and halogen is Br, Cl or F.

The present invention relates also to the use of Ziegler-Natta catalyst (C) as defined above in a multistage process comprising at least one slurry phase polymerization stage and at least one gas phase polymerisation stage for producing ethylene copolymers, preferably for producing ethylene copolymers having the melt flow rate ratio $FRR_{21/5}$ of at least 40 and/or PDI of at least 27.

Preferred embodiments of the invention are described in dependent claims as well in the following description.

According to the process of the invention ethylene copolymers are produced by copolymerising ethylene monomers with one or more alpha-olefin comonomer units. The alpha-olefin comonomer units of polyethylene resins are selected from $C_3$-$C_{20}$-alpha-olefins, preferably are selected from $C_4$-$C_{10}$-alpha-olefins, such as 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the comonomer is 1-butene and/or 1-hexene.

The inventors have now found that by using supported Ziegler-Natta catalyst component and cocatalyst together with a specific external additive of alkoxysilane type, it is possible to broaden the preparation window of polyethylene. Especially it was found that the invention makes it possible to produce multimodal polyethylene where the molecular weight distribution (MWD) is increased in a multistage process comprising at least one slurry phase polymerization stage carried out in at least one slurry phase reactor and at least one gas phase polymerisation stage carried out in at least one gas phase reactor. One specific finding of the invention was that the molecular weight of the high molecular weight (MW) part of the multimodal ethylene copolymer can be increased, i.e. the molecular weight of the final polymer is increased.

The improvements, like the increase in molecular weight and increase of MWD and/or PDI are not made at the expense of the productivity of the catalyst, but the productivity remains still at high level, or is even increased.

The benefits of the invention are especially seen in the multistage polymerisation process comprising at least two polymerization stages, and more specifically in a multistage process, where at least one stage is carried out in slurry phase and at least one stage in gas phase and wherein the catalyst is a Ziegler-Natta catalyst comprising a specific external additive.

Process

The general process configuration is described below.

In the present invention multimodal polymers with respect to the molecular weight distribution (MWD) are produced in a multistage process, where lower molecular weight and higher molecular weight polymers (components) are produced at different polymerization stages.

The process of the present invention comprises at least two polymerisation stages. Thus, the process of the present invention may comprise three or more polymerisation stages.

Even though the present invention relates to a process for producing ethylene polymer compositions in at least two polymerisation stages, especially in two or three stages, it should be understood that the process may contain additional polymerization stages in addition to the at least two stages disclosed above. It may contain as an additional polymerization stage e.g. a prepolymerization stage, as long as the polymer produced in such additional stages does not substantially influence the properties of the polymer. Furthermore, any one of the at least two polymerization stages disclosed above may be conducted as two or more sub-stages, provided that the polymer produced in each such sub-stage as well as their mixture matches the description for the polymer for the respective stage.

However, it is preferred to conduct each of the polymerization stage as a single polymerization stage each carried out in one polymerisation reactor in order to prevent the process from becoming unnecessarily complex. Therefore, in the most preferred embodiment the process consists of at least two polymerization stages, each stage carried out in one reactor, and which may be preceded by a prepolymerization stage.

The term multimodal copolymer describes in general a copolymer which contains distinct components having different average molecular weights or different contents of comonomer or both. The multimodal copolymer is produced by copolymerizing ethylene and a comonomer in two or more polymerization stages where the polymerization conditions are sufficiently different to allow production of different polymers in different stages. In the present invention an essential feature is that the final polymer is multimodal in respect of molecular weight.

Preferably the process is a continuously operated process.

The term, continuously operating process, describes a process or a process stage into which the feedstock materials are continuously or intermittently introduced and from which the product is continuously or intermittently withdrawn. By continuous addition or withdrawal is meant that an uninterrupted stream goes in or flows out of the process or process stage. By intermittent addition or withdrawal is meant that during the operation of the process small batches of raw material are constantly added into or product is constantly withdrawn from the process or process stage. The cycle time between such batches is small compared to the overall average residence time of the process or process stage, such as not more than 10% of the overall average residence time.

According to the preferred embodiment the polymerization process of the present invention is conducted in a cascaded sequence comprising one or two slurry phase polymerisation reactors, more preferably two loop reactors, followed by a gas phase reactor.

The slurry polymerization may be conducted in any known reactor used for slurry polymerization. Such reactors include a continuous stirred tank reactor and a loop reactor. It is especially preferred to conduct the slurry polymerization in loop reactor(s).

Pre-Polymerization Stage

The polymerization steps may be preceded by a pre-polymerization step. The purpose of the pre-polymerisation is to polymerize a small amount of polymer onto the catalyst at a relatively low temperature. By pre-polymerisation it is possible to substantially improve the performance of the catalyst in the following stages. The pre-polymerisation step may be conducted in slurry or in gas phase. Preferably pre-polymerization is conducted in slurry.

Thus, the pre-polymerisation step may be conducted in a loop reactor. The pre-polymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the pre-polymerisation step is typically from 0 to 90° C., preferably from 20 to 80° C. and more preferably from 30 to 70° C.

The pressure is not critical and is typically from 1 to 150 bar, preferably from 40 to 80 bar.

The amount of monomer is typically such that from about 0.1 to 15000 grams of monomer per one gram of solid catalyst component, preferably 50 to 5000 grams of monomer per one gram of solid catalyst component, is polymerized in the pre-polymerisation step. As the person skilled in the art knows, the catalyst particles recovered from a continuous pre-polymerization reactor do not all contain the same amount of prepolymer. Instead, each particle has its own characteristic amount which depends on the residence time of that particle in the pre-polymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

In addition to ethylene monomer it is possible to use one or more alpha-olefin comonomers in the pre-polymerisation step to reduce crystallinity of pre-polymer and/or to increase catalyst activity if desired. Suitable comonomers are, for example, propene, 1-butene, 1-hexene, 4-methyl-1-pentene, 1-octene and their mixtures.

The molecular weight and crystallinity of the pre-polymer may be controlled also by hydrogen as it is known in the art. Further, antistatic additive may be used to prevent the particles from adhering to each other or the walls of the reactor, as disclosed in WO-A-96/19503 and WO-A-96/32420.

The solid catalyst component and cocatalyst are preferably all introduced to the pre-polymerisation step together. However, the solid catalyst component and the cocatalyst can be fed separately. Moreover, it is possible that only a part of the cocatalyst is introduced into the pre-polymerisation stage and the remaining part into subsequent polymerization stages.

The catalyst may be transferred into the (pre)polymerization reactor by any means known in the art. It is thus possible to suspend the catalyst in a diluent and maintain it as homogeneous slurry. Especially preferred it is to use oil having a viscosity from 20 to 1500 mPa·s as diluent, as disclosed in WO-A-2006/063771. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP-A-428054.

Optional Polymerization Stage A1

In the optional polymerization stage A1, an ethylene (co)polymer can be produced. This is done by introducing a polymerization catalyst, optionally through the prepolymerization stage as described above, into the polymerization stage A1 together with ethylene, optionally comonomer, optionally hydrogen and optionally an external additive to produce ethylene (co)polymer P-A1.

The ethylene (co)polymer P-A1 has a melt flow rate $MFR_2$ of from 0 to 1000 g/10 min, preferably from 0 to 750 g/10 min The ethylene (co)polymer P-A1 has Mw from 15000 to 5000000, preferably from 20000 to 3500000.

The optional polymerization stage A1 is conducted as a particle forming process. In such a process the polymerization catalyst is introduced into the process in particle form, preferably through the pre-polymerization step as described above. The first ethylene (co)polymer then grows on the catalyst particles thereby forming a mixture of a fluid reaction mixture and the particles comprising the first polymer.

The polymerization stage A1 is preferably conducted as a slurry polymerization. The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to about 50% by mole, preferably from about 2 to about 20% by mole and in particular from about 2 to about 10% by mole. The benefit of having a high ethylene concentration is that the productivity of the catalyst is increased but the drawback is that more ethylene then needs to be recycled than if the concentration was lower.

The temperature in the optional polymerization stage A1 is typically from 30 to 100° C., preferably from 40 to 95° C. An excessively high temperature should be avoided to prevent partial dissolution of the polymer into the diluent and the fouling of the reactor. The pressure is from 1 to 150 bar, preferably from 40 to 80 bar.

The slurry polymerization may be conducted in any known reactor used for slurry polymerization. Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the polymerization stage A1 continuously.

Hydrogen is optionally introduced into the polymerization stage A1 for controlling the $MFR_2$ of the first copolymer. The amount of hydrogen needed to reach the desired MFR depends on the catalyst used and the polymerization conditions.

The average residence time in the polymerization stage A1 is typically from 20 to 120 minutes, preferably from 30 to 80 minutes. As it is well known in the art the average residence time T can be calculated from:

$$\tau = \frac{V_R}{Q_o} \qquad \text{(eq. 1)}$$

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate in the polymerization stage A1 is suitably controlled with the catalyst feed rate. It is also possible to influence the production rate by suitable selection of the monomer concentration in the polymerization stage A1. The desired monomer concentration can then be achieved by suitably adjusting the ethylene feed rate into the polymerization stage A1.

Polymerization Stage A2

The polymerisation stage A2 is carried out in the first slurry reactor (if only one slurry phase reactor is used) or in a second slurry reactor of the polymerisation configuration (if two slurry phase reactors are used). Stage A2 is followed by polymerization stage B carried out in a gas phase reactor.

In the polymerization stage A2 a (co)polymer P-A2 or (co)polymer mixture P-M1 comprising the optional ethylene (co)polymer P-A1 (produced in the optional stage A1) and a lower molecular weight (Mw) ethylene (co)polymer P-A2 is formed. This is done by introducing active catalyst together with ethylene or feeding ethylene and the particles of the polymer P-A1 containing active catalyst dispersed therein into the polymerization stage A2. Hydrogen and optionally an alpha-olefin comonomer are introduced for controlling the molecular weight and density, respectively, as described above for the optional polymerization stage A1. An external additive is optionally fed to the polymerisation stage A2.

The melt flow rate $MFR_2$ of the (co)polymer P-A2 or (co)polymer mixture P-M1 is from 0 to 1000 g/10 min, preferably from 0.1 to 750 g/10 min and more preferably from 0.2 to 600 g/10 min. Furthermore, the density of the (co)polymer P-A2 or (co)polymer mixture P-M1 is from 935 to 975 $kg/m^3$, preferably from 940 to 975 $kg/m^3$ and most preferably from 945 to 975 $kg/m^3$.

The polymerization in the polymerization stage A2 is advantageously conducted as a slurry polymerization as described above for the optional polymerization stage A1. The temperature in the polymerization stage A2 is suitably from 60 to 100° C., preferably from 65 to 95° C. The pressure is suitably from 1 to 150 bar, preferably from 40 to 80 bar. The polymerization stage A2 is conducted in one or more loop reactors, preferably in one loop reactor.

Hydrogen feed is adjusted to achieve a desired melt flow rate (or molecular weight) of the (co)polymer P-A2 or (co)polymer mixture P-M1. Suitably, the hydrogen feed is controlled to maintain constant hydrogen to ethylene molar ratio in the reaction mixture. The actual ratio depends on the catalyst as well as the type of the polymerization. The desired polymer properties have been obtained in slurry polymerization in a loop reactor by maintaining the $H_2$/ethylene ratio within the range of from 200 to 1000 mol/kmol, preferably from 200 to 800 mol/kmol.

The optional alpha-olefin comonomer is introduced into the polymerization stage A2 for controlling the density of the (co)polymer P-A2 or (co)polymer mixture P-M1. The amount of the comonomer needed to reach the desired density depends on the comonomer type, the catalyst used and the polymerization conditions.

The desired polymer production rate in the polymerization stage A2 may be reached by suitably selecting the ethylene concentration in said polymerization stage A2, in the same way as was described above for the optional polymerization stage A1.

The average residence time in the polymerization stage A2 is typically from 20 to 120 minutes, preferably from 30 to 80 minutes.

If the polymerisation stage A1 is used, the (co)polymer mixture P-M1 comprises from 10 to 60% by weight of the first polymer P-A1 and from 40 to 90% by weight of the (co)polymer P-A2. Preferably, the (co)polymer mixture P-M1 comprises from 20 to 55% by weight of the first polymer and from 45 to 80% by weight of the (co)polymer P-A2. In case polymerisation stage A1 is not used, the polymer mixture P-M1 constitutes the polymer P-A2 only. This is another preferred alternative.

Typically at least a part of the fluid reaction mixture present in the polymerization stage A2 is removed from the polymer. This makes it possible to have a sufficient difference between the molecular weights of the polymers produced in the polymerization stage A2 and the subsequent polymerization stage B.

The (co)polymer P-A2 or (co)polymer mixture P-M1 is then directed to the polymerization stage B whereas the fluid reaction mixture may be directed to a recovery section or alternatively, the removed fluid reaction mixture may be returned wholly or partly into the polymerization stage A1 or A2. In the recovery section the components of the reaction mixture are separated to produce, for instance, recovered streams of monomers and diluent. The recovered streams may then be reused in the polymerization process. The removal of the fluid reaction mixture from the polymer may be done by any means known in the art, such as by flashing or extracting. Flashing is usually preferred because it is a simple and effective process. For instance EP-A-1415999 discloses a suitable method for transferring the polymer from the previous stage to the next polymerization stage.

According to a preferred embodiment the process of the invention comprises two slurry reactors, more preferably two loop reactors (stage A1 and stage A2).

Polymerization Stage B

The polymerisation stage B is carried out in the gas phase reactor of the polymerisation configuration, where one or two slurry reactors followed by a gas phase reactor are used. In case only one slurry reactor is used, stage B is the second polymerization stage and in case two slurry reactors are used B is the third polymerization stage.

In the polymerization stage B a higher molecular weight copolymer P-B is formed. P-B is the final (co)polymer mixture comprising (co)polymer from stage A2, (i.e. P-A2 or the (co)polymer mixture P-M1) and a copolymer of ethylene from stage B. This is done by introducing the particles of the (co)polymer from stage A2 (P-A2 or (co) polymer mixture P-M1), containing active catalyst dispersed therein, together with additional ethylene and an alpha-olefin comonomer into the polymerization stage B and continuing the polymerisation under polymerisation conditions as defined below. This causes the copolymer P-B to form on the particles containing the polymer product of stage A2.

Hydrogen may be introduced for controlling the molecular weight. The desired polymer properties have been obtained in gas phase polymerization in a fluidized bed reactor by maintaining the molar ratio of hydrogen to ethylene within the range of from 1 to 200 mol/kmol, preferably from 1 to 150 mol/kmol.

According to the process of the present invention external additive is fed to the polymerization stage B.

The alpha-olefin comonomer is typically introduced to maintain a constant comonomer to ethylene ratio in the reaction mixture. The comonomer is an alpha-olefin having from 4 to 10 carbon atoms and may be the same as the optional first alpha-olefin comonomer or it may be different therefrom. Preferably the alpha-olefin comonomer is 1-butene, 1-hexene or 1-octene, more preferably 1-butene or 1-hexene. In case a comonomer is introduced into the previous stage, the comonomer is inevitably carried over from the previous polymerization stage into the third polymerization stage. The comonomer to ethylene ratio that is needed to produce a polymer with the desired density depends, among others, on the type of comonomer and the type of catalyst. With 1-hexene as a comonomer the desired polymer properties have been obtained in gas phase polymerization in a fluidized bed reactor with a molar ratio of 1-hexene to ethylene from 1 to 200 mol/kmol, preferably from 5 to 100 mol/kmol.

The polymerization in gas phase may be conducted in a fluidized bed reactor, in a fast fluidized bed reactor or in a settled bed reactor or in any combination of these. When a combination of reactors is used then the polymer is transferred from one polymerization reactor to another. Furthermore, a part or whole of the polymer from a polymerization stage may be returned into a prior polymerization stage.

The desired polymer production rate in the polymerization stage B may be reached by suitably selecting the ethylene concentration in said polymerization stage, in the same way as was described above for the slurry polymerization stages.

Preferably the polymerization stage B is conducted as a fluidized bed gas phase polymerization. In a fluidized bed gas phase reactor an olefin is polymerized in the presence of a polymerization catalyst in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, optional comonomer(s), optional chain growth controllers or chain transfer agents, such as hydrogen, and optional inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871. One or more of the above-mentioned components may be continuously added into the fluidization gas to compensate for losses caused, among other, by reaction or product withdrawal.

From the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO-A-2005/087361. Other types of fluidization grids are disclosed, among others, in U.S. Pat. No. 4,578,879, EP 600414 and EP-A-721798.

The fluidization gas passes through the fluidized bed. The superficial velocity of the fluidization gas must be higher than the minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are known by using common engineering practise.

When the fluidization gas is contacted with the bed containing the active catalyst the reactive components of the gas, such as monomers, comonomers and hydrogen, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO-A-01/05845 and EP-A-499759 disclose such methods. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain a time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidized bed. An example of suitable agitator design is given in EP-A-707513.

Typically the fluidized bed polymerization reactor is operated at a temperature within the range of from 50 to 100° C., preferably from 65 to 90° C. The pressure is suitably from 10 to 40 bar, preferably from 15 to 30 bar.

The average residence time in the polymerization stage B is typically from 40 to 240 minutes, preferably from 60 to 180 minutes.

The polymerization stage B is conducted in one or more gas phase reactors, more preferably in one fluidized bed reactor.

The final copolymer mixture (P-B) typically comprises from 35 to 70% by weight of the (co)polymer from stage A2 ((co)polymer P-A2 or (co)polymer mixture P-M1) and from 30 to 65% by weight of the copolymer produced in stage B.

Suitable processes comprising cascaded slurry and gas phase polymerization stages are disclosed, among others, in WO-A-92/12182 and WO-A-96/18662 of Borealis and known as Borstar technology.

The external additive is fed to the actual polymerisation stage. The essential feature of the multistage process of the present invention comprising at least one slurry phase reactor and at least one gas phase reactor is that the external additive is fed to the gas phase polymerization stage B. The external additive is optionally fed to the optional polymerization stage A1 and/or to the stage A2, however, preferably the external additive is fed to the gas phase stage B only.

Catalysts

The solid catalyst component of the catalyst of the present invention is typically a supported Ziegler-Natta catalyst component. Suitable catalyst components are disclosed in patents as listed above and described below. The solid catalyst component might also contain internal organic compounds or internal electron donors as known in the art.

In this specification, the internal organic compound or internal electron donor is a compound being part of the solid catalyst component and added into said solid catalyst component during its preparation. The external additive is not part of the solid catalyst component but fed to the polymerization process either separately or together with the solid catalyst component or with the cocatalyst as defined in the present disclosure.

Thus, the catalyst according to the invention, which is used in the polymerization process according to the invention comprises i) a solid supported Ziegler-Natta catalyst component ii) an organometallic cocatalyst and iii) a specific external additive.

The solid catalyst component i) used in the present invention comprises at least a transition metal compound of Group 4 to 6 of the Periodic Table (IUPAC, Nomenclature of Inorganic Chemistry, 1989), preferably a compound of Group 4 metal or a vanadium compound, most preferably a titanium compound, a metal compound of Group 1 to 3 of the Periodic Table (IUPAC), most preferably magnesium compound, and, optionally, a compound of group 13 of the Periodic Table (IUPAC), most preferably aluminium compound, and optionally an internal organic compound.

Thus, the catalyst component contains preferably a magnesium compound, a titanium compound, optionally an aluminium compound and optionally an internal organic compound supported on a particulate support, or the catalyst component comprises a titanium compound, optionally an aluminium compound and optionally an internal organic compound supported on a magnesium dihalide based support.

The magnesium compound is preferably a reaction product of an alcohol with magnesium dialkyl, magnesium alkyl alkoxy or magnesium dialkoxy. More preferably magnesium dialkyl is used. The alcohol is a linear or branched aliphatic mono-alcohol of 2 to 16 carbon atoms. Preferably, the alcohol has from 4 to 16 carbon atoms. Branched alcohols are especially preferred, and 2-ethyl-1-hexanol is one example of the preferred alcohols. The magnesium dialkyl may be any compound of magnesium bonding to two alkyl (or two alkoxy or one alkyl and one alkoxy) groups, which may be the same or different. Alkyl and alkoxy groups have typically 1 to 18 carbon atoms, preferably 2 to 12 carbon atoms. Butyl-octyl magnesium is one example of the preferred magnesium dialkyls.

The aluminium compound is typically trialkyl aluminium or chlorine containing aluminium alkyl. Especially preferred compounds are aluminium alkyl dichlorides, dilalkyl aluminium chloride and aluminium alkyl sesquichlorides, or trialkylaluminium. Alkyl groups are preferably alkyls with 1 to 6 carbon atoms, preferably 1 to 4 carbon atoms.

The titanium compound is preferably a halogen containing titanium compound, preferably chlorine containing titanium compound. Especially preferred titanium compound is titanium tetrachloride.

A typical internal organic compound is chosen from the following classes: ethers, esters, amines, ketones, alcohols, anhydrides or nitriles or mixtures thereof. Preferably the internal organic compound is selected from ethers and esters, most preferably from ethers. Preferred ethers are of 2 to 20 carbon-atoms and especially mono, di or multicyclic saturated or unsaturated ethers comprising 3 to 6 ring atoms. Typical cyclic ethers suitable in the present invention, if used, are tetrahydrofuran (THF), substituted THF, like 2-methyl THF, di-cyclic ethers, like 2,2-di(2-tetrahydrofuryl)propane, 2,2-di-(2-furan)-propane, or isomers or mixtures thereof. Internal organic compounds are also often called as internal electron donors.

The particulate support or carrier material can be an inorganic oxide support, such as silica, alumina, titania, silica-alumina and silica-titania, typically silica.

The catalyst can be prepared by sequentially contacting the carrier with the above mentioned compounds, as described e.g. in EP 688794 and WO 99/51646. Alternatively, it can be prepared by first preparing a solution from the components and then contacting the solution with a carrier, as described in WO 01/55230.

Alternatively the catalyst component used in the present invention may be supported on MgCl$_2$. Such catalysts are disclosed widely in prior art, for instance, in EP376936, WO 2005/118655 and EP 810235, or can be a modified versions thereof. According to one preferred modification method the catalyst may be prepared by contacting spheroidal or granular MgCl$_2$*mROH, like MgCl$_2$*mEtOH, carrier material with an internal organic compound, preferably with a dicyclic ether compound, in the beginning of the catalyst synthesis before a treatment with the titanium compound (e.g. TiCl$_4$) or even before treating the MgCl$_2$*mEtOH carrier material with a Group 13 compound and finally recovering the solid catalyst component.

Accordingly, one preferred catalyst as described above and used in the present invention comprises a solid MgCl$_2$ supported component which is prepared by a method comprising the steps:

a) providing solid carrier particles of MgCl$_2$*mROH adduct b) pre-treating the solid carrier particles of step a) with a compound of Group 13 metal c) treating the pre-treated solid carried particles of step b) with a transition metal compound of Group 4 to 6 d) recovering the solid catalyst component wherein the solid carrier particles are contacted with an internal organic compound of formula (II) or isomers or mixtures therefrom before treating the solid carrier particles in step c)

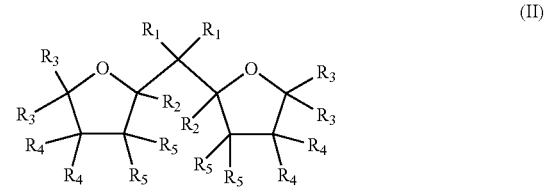

(II)

and
wherein in the formula (II) or isomers or mixtures therefrom
$R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, the two oxygen-containing rings are individually saturated or partially unsaturated or unsaturated, and R in the adduct $MgCl_2 \cdot mROH$ is a linear or branched alkyl group with 1 to 12 C atoms, and m is 0 to 6.

The cocatalysts ii), which are also known as activators, are organometal compounds of Group 13 metal, typically organoaluminium compounds. These compounds include alkyl aluminium compounds and alkyl aluminium halides. Typical trialkylaluminium compounds are trimethylaluminium, triethylaluminium, tri-isobutylaluminium, trihexylaluminium and tri-n-octylaluminium or other aluminium alkyl compounds, such as isoprenylaluminium, and typical alkyl aluminium halides include alkyl aluminium chlorides, such as ethylaluminium dichloride, diethylaluminium chloride, ethylaluminium sesquichloride, dimethylaluminium chloride and the like. Especially preferred cocatalysts are trialkylaluminiums, of which triethylaluminium, trimethylaluminium and tri-isobutylaluminium are particularly used.

As indicated above, the essential feature of the present invention is that a specific type of external additive iii) is used. The external additives used in the present invention are alkoxysilane type external additives. More specific the external additive has formula (I)

where n is an integer 0 to 3, each $R^1$ can be equal or different and are selected among H, halogen, alkyl groups of 1 to 6 carbon atoms and alkenyl groups of 2 to 6 carbon atoms both optionally substituted with one or more halogen atoms, and aryl groups of 6 to 12 carbon atoms optionally substituted with one or more halogen atoms, or the $R^1$ groups can form with the Si atom they are linked to a ring of 3 to 8 ring atoms, provided that all $R^1$ are not hydrogen, $R^2$ can be equal or different and are selected among alkyl groups of 1 to 6 carbon atoms and alkenyl groups of 2 to 6 carbon atoms both optionally substituted with one or more halogen atoms, and aryl groups of 6 to 12 carbon atoms optionally substituted with one or more halogen atoms, or the $OR^2$ groups can form with the Si atom they are linked to a ring of 3 to 8 ring atoms, and halogen is Br, Cl or F.

Mixtures of alkoxysilanes of formula (I) are also within the scope of the present invention.

The external additive is used in polymerisation process in amounts corresponding Si/Ti mol/mol ratio of 0.2 to 5.0, preferably 0.3 to 3, more preferably 0.5 to 2.5.

In embodiments of formula (I)

n is preferably an integer 1 to 3, all $R^1$ groups are preferably the same or different and are hydrogen or alkyl groups of 1 to 6 carbon atoms or aryl groups of 6 to 12 carbon atoms, more preferably all $R^1$ groups are the same or different and are hydrogen or linear alkyl groups of 1 to 3 carbon atoms, more preferably alkyl groups of 1 to 2 carbon atoms, provided that all $R^1$ are not hydrogen, all $R^2$ groups are preferably the same and are alkyl groups of 1 to 3 carbon atoms, more preferably alkyl groups of 1 to 2 carbon atoms.

Thus, in a most preferred embodiment of formula (I), each $R^1$ is independently hydrogen or methyl or ethyl, provided that at least one $R^1$ is methyl or ethyl, $R^2$ is methyl or ethyl and n is 1 or 2.

Preferred external additives used in the present invention are dimethoxydimethylsilane, trimethoxymethylsilane, diethoxydimethylsilane, dimethoxydiethylsilane, dimethoxydi-n-propylsilane, dimethoxy(methyl)silane, vinylmethyldimethoxysilane, chloromethyl(methyl)dimethoxysilane, dimethoxymethylphenylsilane, 3-chloropropyldimethoxymethylsilane, trimethoxy(3,3,3-trifluoropropyl)silane, 3-chloropropyltrimethoxysilane.

Especially preferred alkoxysilanes are dimethoxy(methyl)silane, dimethoxydimethylsilane and trimethoxymethylsilane.

Thus, according to a preferred embodiment of the invention the multistage process for producing ethylene copolymers comprises the steps of (a1) introducing ethylene, optionally hydrogen and optionally alpha-olefin comonomer having from 4 to 10 carbon atoms into an optional polymerisation stage A1 in the presence of a solid catalyst Ziegler-Natta component, a cocatalyst and optionally an external additive, (b1) maintaining said polymerisation stage in such conditions as to produce an ethylene homo- or copolymer product P-A1

(a2-i) feeding ethylene, the polymerisation product P-A1, optionally alpha-olefin comonomer having from 4 to 10 carbon atoms and optionally an external additive to a polymerization stage A2, or (a2-ii) feeding ethylene, a solid catalyst Ziegler-Natta component, a cocatalyst, optionally alpha-olefin comonomer having from 4 to 10 carbon atoms and optionally an external additive to a polymerization stage A2

(b2) maintaining said polymerisation stage A2 in such conditions as to produce a lower Mw (co)polymer P-A2 or a (co)polymer mixture P-M1 comprising the optional ethylene (co)polymer P-A1 and the lower Mw ethylene (co)polymer P-A2, (c) feeding the polymerisation product P-A2 or the (co)polymer mixture P-M1, additional ethylene and an alpha-olefin comonomer having from 4 to 10 carbon atoms, an external additive, which can be the same or different as the optional external additive in step (a1) or (a2), optionally hydrogen and optionally additional cocatalyst to the polymerization stage B, (d) maintaining said polymerisation stage B in such conditions as to produce a higher molecular weight polymerisation product P-B, (e) recovering the polymerisation product P-B from the polymerization stage B, wherein the external additive has the formula (I)

where n is an integer 1 to 3, all $R^1$ groups are the same or different and are hydrogen or alkyl groups of 1 to 6 carbon atoms or aryl groups of 6 to 12 carbon atoms, more preferably all $R^1$ groups are the same or different and are hydrogen or alkyl groups of 1 to 3 carbon atoms, more preferably alkyl groups of 1 to 2 carbon atoms, provided that all $R^1$ are not hydrogen, all $R^2$ groups are the same and are alkyl groups of 1 to 3 carbon atoms, more preferably alkyl groups of 1 to 2 carbon atoms, and wherein the optional polymerization stage A1 and the polymerization stage A2 are slurry polymerization stages and polymerization stage B is a gas phase polymerization stage.

Slurry reactors are preferably loop reactors in all embodiments of the invention. The polymerization stage B comprises at least one gas phase reactor, preferably one gas phase reactor.

In the preferred embodiment the external additive is added only to the gas phase reactor of the multistage process comprising slurry and gas phase reactors.

Polymer Properties

According to the process of the invention it's possible to produce ethylene copolymers with very broad MWD in a multistage process, and still keep the productivity on a good level (FIG. 2). $MFR_5$ values of the final polymer (P-B) from as low as 0.03 g/10 min are possible. Representative $MFR_5$ value ranges can be from 0.03 g/10 min to 5 g/10 min, preferably from 0.05 to 3 g/10 min and more preferably from 0.07 to 1 g/10 min. (190° C., 5 kg load).

The low $MFR_5$ together with high $FFR_{21/5}$ values indicate that the polymers produced in the gas-phase reactor have high molecular weight.

Furthermore, it is preferred that the melt flow rate ratio $FRR_{21/5}$ of the final polymer is at least 40, preferably more than 50, e.g. at least 52, more preferably at least 55. Thus, the flow rate ratio $FRR_{21/5}$ is preferably in the range of 40 to 100, preferably $50 < FRR_{21/5} \leq 100$, like in the range of 52 to 100, more preferably in the range of 55 to 90, indicating broad molecular weight distribution. In addition, in preferred embodiment the polydispersity index PDI of the final polymer is at least 27.

The alpha-olefin comonomer used in the polymerization process of the invention is selected from alpha-olefins containing 4 to 10 carbon atoms, most preferably from 1-butene and 1-hexene. The content of the comonomer is controlled to obtain the desired density of the final polymer.

Typically the final polymer has a density of from 920 to 965 kg/m³, preferably from 935 to 960 kg/m³, more preferably from 940 to 957 kg/m³.

FIGURES

EXPERIMENTAL PART

Figure 1:
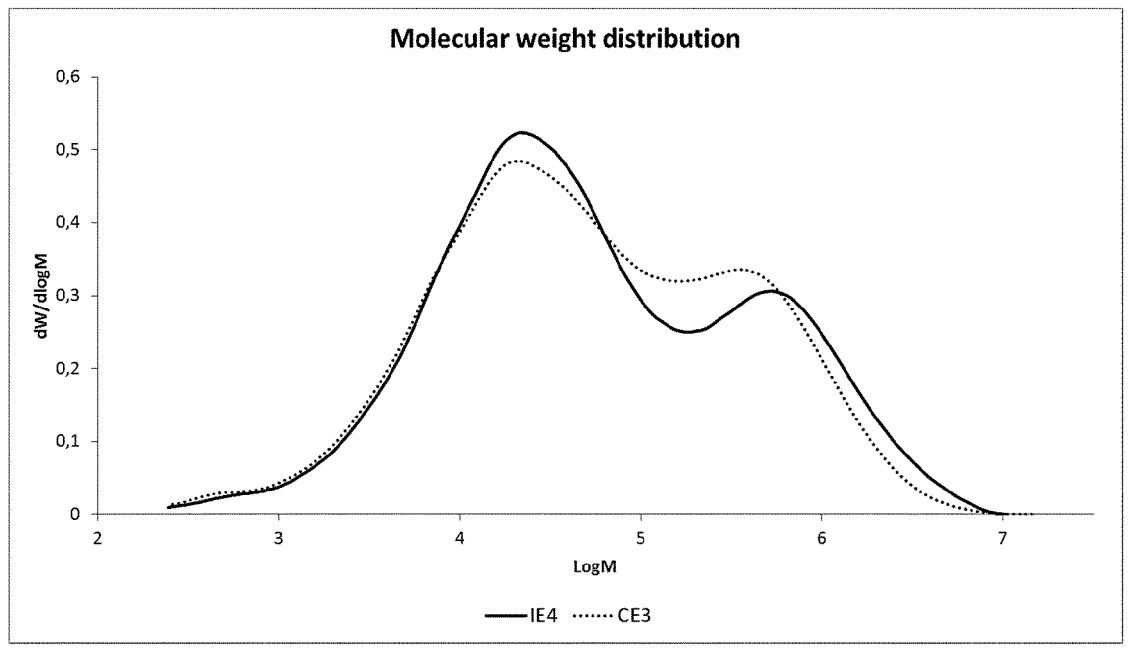
FIG. 1 shows the molecular weight curves of inventive example 4 (IE4) and of comparative examples 3 (CE3) indicating the differences in modality of the polymers.

Methods
Melt Flow Rate
  $MFR_2$: 190° C., 2.16 kg load
  $MFR_5$: 190° C., 5.0 kg load
  $MFR_{21}$: 190° C., 21.6 kg load The melt flow rates are measured in accordance with ISO 1133 at 190° C. and under given load and is indicated in units of grams/10 minutes. The melt flow rate is an indication of the molecular weight of the polymer. The higher the melt flow rate, the lower the molecular weight of the polymer.

FRR21/5 is a ratio of $MFR_{21}/MFR_5$

Molecular Weight Averages, Molecular Weight Distribution (Mn, Mw, Mz, MWD, PDI)

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i / M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i / M_i)} \quad (3)$$

For a constant elution volume interval $\Delta V_i$, where $A_i$, and $M_i$ are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0.5 kg/mol to 11 500 kg/mol.

The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\eta_{PS}=0.655$ $K_{PE}=39\times10^{-3}$ mL/g, $\eta_{PE}=0.725$ $K_{PP}=19\times10^{-3}$ mL/g, $\eta_{PP}=0.725$ A third order polynomial fit was used to fit the calibration data.

All samples were prepared in the concentration range of 0.5-1 mg/ml and dissolved at 160° C. for 3 hours for PE under continuous gentle shaking.

Density

Density is measured according to ISO1183-1987

Comonomer Content from PE (NMR)

Quantification of Microstructure by NMR Spectroscopy

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.{klimke06, parkinson07, castignolles09} Standard single-pulse excitation was employed utilising the transient NOE at short recycle delays of 3 s {pollard04, klimke06} and the RS-HEPT decoupling scheme{fillip05,griffin07}.

A total of 1024 (1 k) transients were acquired per spectrum. This setup was chosen for high sensitivity towards low comonomer contents. When the determined comonomer content was observed to be below 0.2 mol % under these conditions sensitivity was increased by acquiring a total of 16384 (16 k) transients per spectrum. This setup was chosen for very high sensitivity towards very low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {randall89}.

Characteristic signals corresponding to the incorporation of 1-hexene were observed (randall89) and all contents calculated with respect to all other monomers present in the polymer.

Characteristic signals resulting from isolated 1-hexene incorporation i.e. EEHEE comonomer sequences, were observed. Isolated 1-hexene incorporation was quantified using the integral of the signal at 38.29 ppm assigned to the *B4 sites, accounting for the number of reporting sites per comonomer:

$$H=I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total}=H$$

Characteristic signals resulting from saturated end-groups were observed. The content of such saturated end-groups was quantified using the average of the integral of the signals at 22.84 and 32.23 ppm assigned to the 2s and 2s sites respectively:

$$S=(1/2)*(I_{2S}+I_{3S})$$

The relative content of ethylene was quantified using the integral of the bulk methylene (δ+) signals at 30.00 ppm:

$$E=(1/2)*I_{\delta+}$$

The total ethylene comonomer content was calculated based the bulk methylene signals and accounting for ethylene units present in other observed comonomer sequences or end-groups:

$$E_{total}=E+(5/2)*H+(3/2)*S$$

The total mole fraction of 1-hexene in the polymer was then calculated as:

$$fH=(H_{total})/(E_{total}+H_{total})$$

The total comonomer incorporation of 1-hexene in weight percent was calculated from the mole fraction in the standard manner:

$$H[\text{wt \%}]=100fH*84.16)(fH*84.16)/(fH84.16)+((1-fH)*28.05))$$

klimke06

Klimke, K., Parkinson, M., Piel, C., Kaminsky, W., Spiess, H. W., Wilhelm, M., Macromol. Chem. Phys. 2006; 207:382.

parkinson07

Parkinson, M., Klimke, K., Spiess, H. W., Wilhelm, M., Macromol. Chem. Phys. 2007; 208:2128.

pollard04

Pollard, M., Klimke, K., Graf, R., Spiess, H. W., Wilhelm, M., Sperber, O., Piel, C., Kaminsky, W., Macromolecules 2004; 37:813.

filip05

Filip, X., Tripon, C., Filip, C., J. Mag. Resn. 2005, 176, 239 griffin07

Griffin, J. M., Tripon, C., Samoson, A., Filip, C., and Brown, S. P., Mag. Res. in Chem. 2007 45, S1, S198 castignolles09

Castignolles, P., Graf, R., Parkinson, M., Wilhelm, M., Gaborieau, M., Polymer 50 (2009) 2373 randall89

J. Randall, Macromol. Sci., Rev. Macromol. Chem. Phys. 1989, C29, 201.

EXAMPLES

Reference Example 1

Preparation of Solid Catalyst Component 1

Mg Compound Preparation:

Toluene (87 kg) was added into the 100 liter reactor. Then Bomag A, provided by Chemtura, (45.5 kg, 20 wt % butyloctyl magnesium in heptane) was also added to the reactor. Then 2-ethyl-1-hexanol (161 kg, 99.8 wt %) was introduced into the reactor at a flow rate of 24-40 kg/h. The molar ratio between BOMAG-A and 2-ethyl-1-hexanol was 1:1.83.

Preparation of Solid Catalyst Component:

Silica (330 kg of calcined silica, Sylopol® 2100) and pentane (0.12 kg/kg carrier) were charged into a catalyst preparation reactor. Then EADC (ethylaluminium dichloride, 2.66 mol/kg silica) was added into the reactor at a temperature below 40° C. during two hours and mixing was continued for one hour. The temperature during mixing was 40-50° C. Then the magnesium compound prepared as described above was added (2.56 mol Mg/kg silica) at 50° C. during two hours and mixing was continued at 40-50° C. for one hour. Then 0.84 kg pentane/kg silica was added into the reactor and the slurry was stirred for 4 hours at the temperature of 40-50° C. Finally, TiCl$_4$ (1.47 mol/kg silica) was added during at least 1 hour, but less than 1.5 hours at 55° C. to the reactor. The slurry was stirred at 50-60° C. for five hours. The catalyst was then dried by purging with nitrogen.

Molar composition of the recovered catalyst is: AII/Mg/Ti=1.5/1.4/0.8

Reference Example 2

Preparation of Solid Catalyst Component 2
Raw Materials

The standard 10 and 25 wt % TEA (triethyl aluminium) solutions in heptane were prepared by dilution of 100% TEA-S from Chemtura.

$MgCl_2*3EtOH$ carriers were received from GRACE 2,2-Di(2-tetrahydrofuryl)propane (DTHFP) was supplied by TCI EUROPE N.V. as a mixture (1:1) of diastereomers (D,L-(rac)-DTHFP and meso-DTHFP.

$TiCl_4$ was supplied by Aldrich (Metallic impurities <1000 ppm, Metals analysis >99.9%).

A. Pre-Treated Support Material Preparation:

In an inert atmosphere glove box (<1 ppm $O_2$, $H_2O$): A dry 100 mL, 4-neck round-bottom flask equipped with two rubber septa, a thermometer, and mechanical stirrer was charged with 0.38 g of DTHFP (DTHFP/Mg=0.1 mol/mol) dissolved in 30 mL of heptane and 5 g (20 mmol of Mg) of granular 21 μm (d50) $MgCl_2*3EtOH$ carrier. The flask was removed from the glove-box, a nitrogen inlet and outlet were fixed. The flask was placed in a cooling bath and stirred for approximately 10 min at 250 rpm. A precooled 25 wt % solution of triethylaluminum (30.4 g, 67 mmol of Al; Al/EtOH=1.0 mol/mol) in heptane was added dropwise during 1 h time, keeping the temperature below 0° C. The obtained suspension was heated to 80° C. in 20 min and kept at this temperature for 30 min at 250 rpm. The suspension was settled for 5 min at 80° C., and the liquid was removed via cannula. The obtained pre-treated support material was washed twice with 50 mL of toluene at room temperature (addition of toluene, stirring at 250 rpm for 15-120 min, settling for 5 min, removal of liquid by cannula).

B. Catalyst Preparation:

At room temperature, 50 mL of toluene was added to the pre-treated support material. The mixture was stirred for approximately 30 min at 250 rpm. Neat $TiCl_4$ (3.8 g, 20 mmol; Ti/Mg=1.0 mol/mol) was added dropwise, and the temperature was maintained between 25-35° C. The obtained suspension was heated to 90° C. in 20 min and kept at this temperature for 60 min at 250 rpm. The suspension was settled for 5 min at 90° C., and the liquid was removed-via cannula. The obtained catalyst was washed twice with 50 mL of toluene at 90° C., and once with 50 mL of pentane at room temperature (addition of preheated toluene or pentane, stirring at 250 rpm for 15 min, settling for 5 min, removal of liquid via cannula). The catalyst was dried with nitrogen flow at 50° C. for 1.5 h. The yield was 3.4 g (94% based on Mg).

Inventive Examples 1-5 (IE1-IE5) and Comparative Examples 1, 2 and 3 (CE1, CE2 and CE3)

Ethylene hexene copolymer was produced in a continuous multistage process comprising two slurry-loop reactors of size 150 and 350 litres and one gas phase reactor. In addition a prepolymerisation step was used in examples IE4-IE5 and CE1 and CE2. Temperature in the prepolymerisation step was 70° C., 95° C. in the loop reactors, and 85° C. in the gas phase reactor. In examples IE1, IE2 and IE3 and CE3 the prepolymerisation step was not used. Propane was used as the reaction medium in the loop reactors. The same catalyst component of reference example 1 and triethylaluminium (TEA) as cocatalyst were used at an Al/Ti molar ratio of 2. The sum of all cocatalyst feeds to the loop reactor includes the optional prepolymerisation step, $1^{st}$ loop reactor, and $2^{nd}$ loop reactor. In the inventive examples dimethyldimethoxy silane (DMDS) was used as the external additive (external donor) supplied by TCI EUROPE N.V., used as received.

In comparative examples no external donor was used.

The polymerisation conditions and results of IE1-IE5 and CE1-CE3 are disclosed in Table 1 and properties of the corresponding final polymers are disclosed in Table 2.

TABLE 1

| Polymerisation conditions and final polymer properties | | | | | | | | |
|---|---|---|---|---|---|---|---|---|
| EXAMPLE | IE1 | IE2 | IE3 | IE4 | IE5 | CE1 | CE2 | CE3 |
| Catalyst feed (g/h) | 5.2 | 5.0 | 5.1 | 6.0 | 9.0 | 10.4 | 9.0 | 9.6 |
| PREPOL REACTOR | | | | | | | | |
| $C_2$ feed (kg/h) | — | — | — | 2.0 | 2.0 | 2 | 2 | — |
| $H_2$ feed (g/h) | — | — | — | 4.8 | 4.9 | 4.9 | 4.8 | — |
| $1^{st}$ LOOP REACTOR (A1) | | | | | | | | |
| Press. (MPa) | 6.0 | 6.0 | 6.0 | 6.0 | 6.0 | 5.6 | 5.6 | 6.0 |
| $H_2/C_2$ ratio (mol/kmol) | 496 | 488 | 503 | 288 | 485 | 421 | 269 | 338 |
| split % | 32 | 30 | 28 | 29 | 24 | 23 | 24 | 21 |
| $MFR_2$ (g/10 min) | 504 | 513 | 516 | 105 | 402 | 224 | 85 | 295 |
| $2^{nd}$ LOOP REACTOR (A2) | | | | | | | | |
| Press. (MPa) | 5.4 | 5.4 | 5.4 | 5.5 | 5.5 | 5.2 | 5.2 | 5.4 |
| $H_2/C_2$ ratio (mol/kmol) | 437 | 441 | 440 | 326 | 486 | 534 | 411 | 369 |
| split % | 34 | 31 | 29 | 30 | 25 | 23 | 25 | 32 |
| $MFR_2$ (g/10 min) | 371 | 383 | 384 | 109 | 464 | 488 | 170 | 295 |
| Al/Ti (mol/mol) | 15 | 16 | 16 | 14 | 15 | 6 | 7 | 10 |
| GAS PHASE REACTOR (B) | | | | | | | | |
| Temp. (° C.) | 85 | 85 | 85 | 85 | 85 | 85 | 85 | 85 |
| Press. (MPa) | 2.0 | 2.0 | 2.0 | 2.0 | 2.0 | 2.0 | 2.0 | 2.0 |
| DMDS feed (g/h) | 0.90 | 0.90 | 0.90 | 0.55 | 0.63 | — | — | — |
| $C_2$ kPa partial | 406 | 558 | 496 | 626 | 530 | 124 | 128 | 164 |
| Si/Ti ratio (mol/mol) | 1.9 | 2.0 | 2.0 | 1.0 | 0.8 | — | — | — |
| $H_2/C_2$ ratio(mol/kmol) | 1.8 | 2.7 | 1.4 | 5.2 | 14.5 | 3.2 | 4.3 | 3.1 |
| $C_6/C_2$ ratio (mol/kmol) | 99 | 41 | 48 | 49 | 20 | 54 | 53 | 33 |
| split % | 34 | 39 | 43 | 41 | 48 | 51 | 49 | 46 |
| Cat. prod. kg PE/g cat | 15.9 | 17.1 | 17.4 | 13.2 | 9.6 | 7.9 | 8.5 | 9.1 |

TABLE 2

Properties of the final polymer

| EXAMPLE | IE1 | IE2 | IE3 | IE4 | IE5 | CE1 | CE2 | CE3 |
|---|---|---|---|---|---|---|---|---|
| Density (kg/m3) | 953.2 | 955.3 | 954.0 | 953.9 | 954.3 | 947.0 | 949.7 | 954.9 |
| $MFR_5$ (g/10 min) | 0.23 | 0.07 | 0.09 | 0.16 | 0.20 | 0.27 | 0.36 | 0.16 |
| $MFR_{21}$ (g/10 min) | 14.70 | 5.81 | 6.50 | 9.30 | 8.65 | 9.35 | 11.70 | 6.15 |
| $FFR_{21/5}$ | 64 | 83 | 72 | 58 | 43 | 35 | 32 | 38 |
| $C_6$ content by $^{13}C$ NMR (wt %) | nm | nm | 0.9 | 0.6 | 0.7 | 1.8 | 1.5 | 0.4 |
| Mn | nm | nm | 9430 | 11100 | 9335 | 9630 | 11250 | 9975 |
| Mw | nm | nm | 406500 | 318500 | 248500 | 239000 | 248000 | 257500 |
| Mz | nm | nm | 2500000 | 1910000 | 1335000 | 1435000 | 1565000 | 1515000 |
| PDI (Mw/Mn) | nm | nm | 43 | 29 | 27 | 25 | 22 | 26 | nm = not measured

Inventive Example 6 (IE6) and Comparative Example 4 (CE4)

Ethylene hexene copolymer was produced in a continuous multistage process comprising two slurry-loop reactors of size 150 and 350 litres and one gas phase reactor. In addition a prepolymerisation step was used in examples IE6 and CE4. Temperature in the prepolymerisation step was 70° C., 95° C. in the loop reactors, and 85° C. in the gas phase reactor. Propane was used as the reaction medium in the loop reactors. The same catalyst component prepared according to the reference example 2 and triethylaluminium (TEA) as cocatalyst were used at an Al/Ti molar ratio of 2. The sum of all cocatalyst feeds to the loop reactor includes the optional prepolymerisation step, $1^{st}$ loop reactor, and $2^{nd}$ loop reactor. In the inventive example IE6 dimethyldimethoxy silane (DMDS) was as the external additive (external donor), supplied by TCI EUROPE N.V., used as received.

In comparative example CE4 no external donor was used.

The polymerisation conditions, results and final polymer properties of IE6 and CE4 are disclosed in Table 3

TABLE 3

| EXAMPLE | IE6 | CE4 |
|---|---|---|
| Catalyst feed (g/h) | 10.9 | 14.9 |
| PREPOL REACTOR | 70 | 70 |
| $C_2$ feed (kg/h) | 2.0 | 2.0 |
| $H_2$ feed (g/h) | 2 | 5 |
| $1^{st}$ LOOP REACTOR (A1) | | |
| Press. (MPa) | 5.6 | 5.6 |
| $H_2/C_2$ ratio (mol/kmol) | 601.4 | 629.7 |
| split % | 21 | 20 |
| $MFR_2$ (g/10 min) | 112 | 274 |
| $2^{nd}$ LOOP REACTOR (A2) | | |
| Press. (MPa) | 5.1 | 5.1 |
| $H_2/C_2$ ratio (mol/kmol) | 427 | 650 |
| split % | 38 | 37 |
| $MFR_2$ (g/10 min) | 188 | 388 |
| Al/Ti (mol/mol) | 15 | 15 |
| GAS PHASE REACTOR (B) | | |
| Temp. (° C.) | 85 | 85 |
| Press. (MPa) | 2.0 | 2.0 |
| DMDS feed (g/h) | 3.64 | — |
| $C_2$ kPa partial | 2.6 | 0.54 |
| Si/Ti ratio (mol/mol) | 2.7 | — |
| $H_2/C_2$ ratio (mol/kmol) | 2.2 | 11.7 |
| $C_6/C_2$ ratio (mol/kmol) | 7.0 | 18.9 |
| split % | 40 | 41 |
| Cat. prod. kg PE/g cat | 7.1 | 5.7 |

TABLE 3-continued

| EXAMPLE | IE6 | CE4 |
|---|---|---|
| FINAL POLYMER | | |
| Density (kg/m3) | 954.8 | 954.3 |
| $MFR_5$ (g/10 min) | 0.06 | 0.24 |
| $MFR_{21}$ (g/10 min) | 4.72 | 14.90 |
| $FFR_{21/5}$ | 79 | 62 |
| $C_6$ content by $^{13}C$ NMR (wt %) | 0.25 | 0.6 |
| Mn | 8595 | 6970 |
| Mw | 496500 | 279500 |
| Mz | 2410000 | 1640000 |
| PDI (Mw/Mn) | 58 | 40 |

Figure 2:
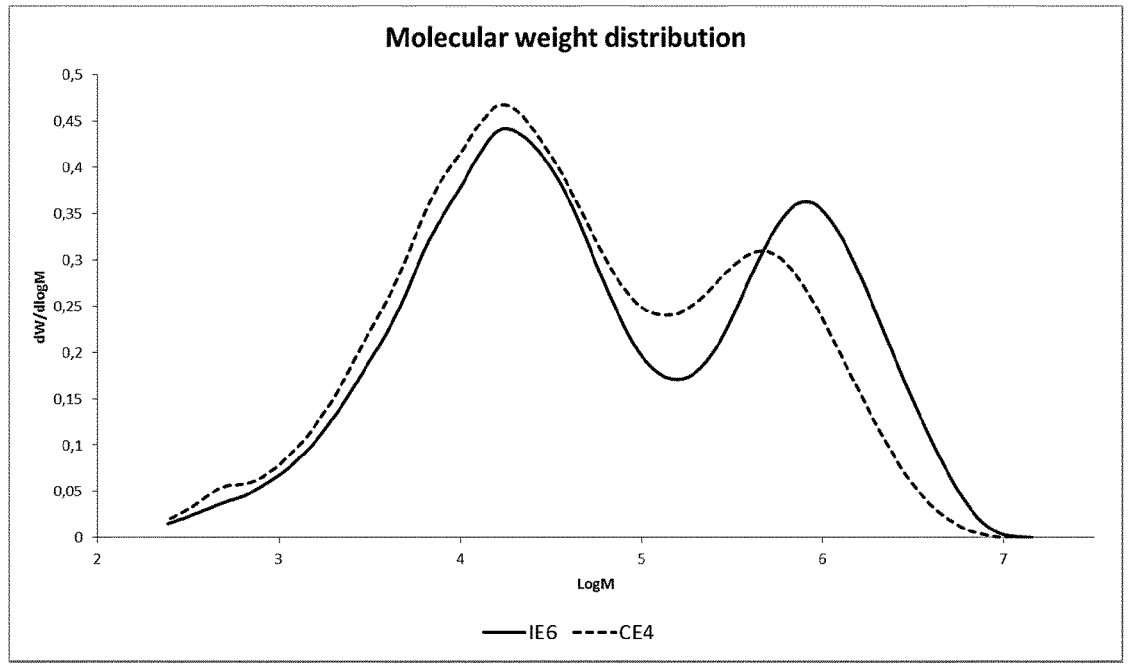
FIG. 2 shows the molecular weight curves of inventive example 6 (IE6) and of comparative examples 4 (CE4) indicating the differences in modality of the polymers.
Figure 3:
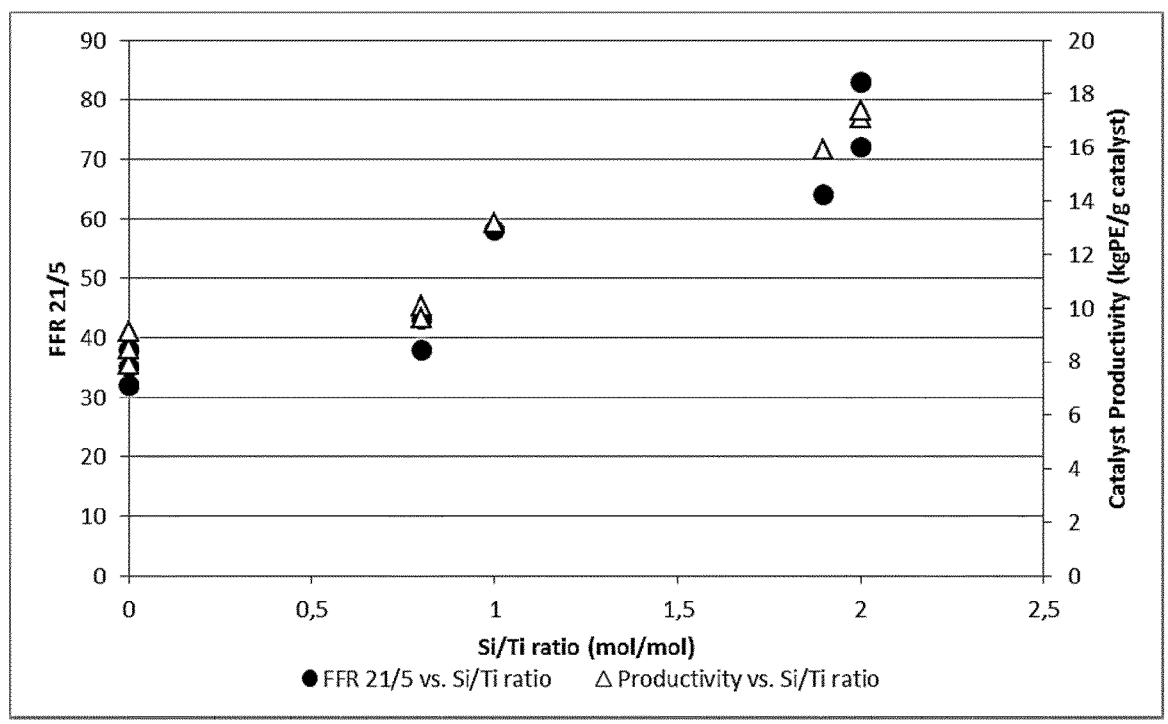
FIG. 3 shows the $FRR_{21/5}$ ratio and productivity vs. Si/Ti mol/mol ratio of the comparative and inventive examples.

As can be seen from the examples, ethylene copolymers produced with the process and with the catalysts of the invention containing defined alkoxysilane as external additive have lower $MFR_5$ combined with high $FFR_{21/5}$ values and thus clearly higher molecular weight of the fraction of the gas phase reactor (GPR) than ethylene copolymers produced with a catalyst without any external donor. Defined alkoxysilanes as external additives reduce hydrogen response of the catalysts (IE5 vs. CE1-3) and also increase ethylene partial pressure in GPR (IE1-3 vs. CE1-3 and IE6 vs. CE4), thus allowing production of ethylene copolymer of higher molecular weight in GPR, than with a catalyst without any external donor (FIGS. 1 and 2). Further, the higher $FFR_{21/5}$ ratios of the inventive examples indicate that the desired broader molecular weight distribution is achieved. At the same time the productivity of the inventive catalysts comprising the defined external additives is higher (FIG. 3).

The invention claimed is:

1. A Ziegler-Natta catalyst comprising:
   a cocatalyst of an organometal compound of Group 13 metal;
   an external additive of formula (I)

$$R^1_n Si(OR^2)_{4-n} \quad \text{(I)}$$

wherein, in formula (I),
   n is an integer 0 to 3,
   each $R^1$ are equal or different and are selected among H, halogen, alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the $R^1$ groups can form with the Si atom they are linked to a ring of 3 to 8 ring atoms, provided that all $R^1$ are not hydrogen,
   $R^2$ are equal or different and are selected among alkyl groups of 1 to 6 carbon atoms optionally substituted with one or more halogen atoms, alkenyl groups of 2 to 6 carbon atoms optionally substituted with one or more halogen atoms, and aryl groups of 6 to 12 carbon atoms optionally substituted with one or more halogen atoms, or the $OR^2$ groups can form with the Si atom they are linked to a ring of 3 to 8 ring atoms, and halogen is Br, Cl or F; and a solid Ziegler-Natta catalyst component supported on a magnesium dichloride support, the solid Ziegler-Natta catalyst component comprising a compound of Group 4 to 6 metal, an aluminum compound, and an internal organic compound of formula (II)

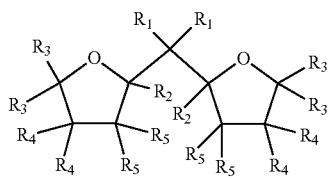

(II)

wherein, in formula (II), $R_1$ to $R_5$ are the same or different and are selected from the group consisting of hydrogen, linear or branched $C_1$ to $C_8$-alkyl groups, and $C_3$-$C_8$-alkylene groups, or wherein two or more of $R_1$ to $R_5$ form a ring; and the two oxygen-containing rings are individually saturated, partially unsaturated, or unsaturated.

2. The Ziegler-Natta catalyst according to claim 1, wherein in the formula (I) n is an integer 1 to 3, all $R^1$ groups are the same or different and are hydrogen or alkyl groups of 1 to 6 carbon atoms or aryl groups of 6 to 12 carbon atoms, provided that all le are not hydrogen, and all $R^2$ groups are the same and are alkyl groups of 1 to 3 carbon atoms.

3. The Ziegler-Natta catalyst according to any of claim 1, wherein in the formula (I) each $R^1$ is independently hydrogen, methyl or ethyl, $R^2$ is methyl or ethyl, provided that at least one $R^1$ is methyl or ethyl, and n is 1 or 2.

4. The Ziegler-Natta catalyst according to claim 1, wherein the solid Ziegler-Natta catalyst component comprises a titanium compound, an aluminum compound, and an internal organic compound of formula (II).

5. The Ziegler-Natta catalyst according to claim 1, wherein the solid Ziegler-Natta catalyst component comprises a solid $MgCl_2$ supported component which is prepared by a method comprising the steps:
 a) providing solid carrier particles of $MgCl_2$*mROH adduct, wherein R is a linear or branched alkyl group with 1 to 12 C atoms, and m is 0 to 6;
 b) pre-treating the solid carrier particles of step a) with a compound of Group 13 metal;
 c) treating the pre-treated solid carried particles of step b) with a transition metal compound of Group 4 to 6; and
 d) recovering the solid catalyst component;
wherein the solid carrier particles are contacted with an internal organic compound of formula (II) or isomers or mixtures therefrom before treating the solid carrier particles in step c)

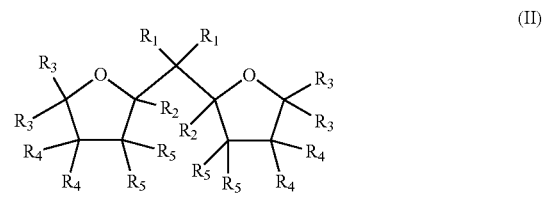

(II)

wherein in the formula (II) or isomers or mixtures therefrom $R_1$ to $R_5$ are the same or different and can be hydrogen, a linear or branched $C_1$ to $C_8$-alkyl group, or a $C_3$-$C_8$-alkylene group, or two or more of $R_1$ to $R_5$ can form a ring, and the two oxygen-containing rings are individually saturated or partially unsaturated or unsaturated.

6. The Ziegler-Natta catalyst according to claim 1, wherein the external additive is selected from the group consisting of dimethoxydimethylsilane, trimethoxymethylsilane, diethoxydimethylsilane, dimethoxydiethylsilane, dimethoxydi-n-propylsilane, dimethoxy(methyl)silane, vinylmethyldimethoxysilane, chloromethyl(methyl)dimethoxysilane, dimethoxymethylphenylsilane, 3-chloropropyldimethoxymethylsilane, trimethoxy(3,3,3-trifluoropropyl)silane, and 3-chloropropyltrimethoxysilane.

7. The Ziegler-Natta catalyst according to claim 1, wherein the cocatalyst is an organoaluminium compound.

8. A method of use of the Ziegler-Natta catalyst of claim 1 in a multistage polymerization process comprising at least one slurry phase polymerization reactor and at least one gas phase polymerization reactor for producing ethylene copolymers.

9. The method Use of the Ziegler Natta catalyst according to claim 8 for producing ethylene copolymer having melt flow rate ratio $FRR_{21/5}$ at least 40 and polydispersity index PDI of at least 27.

10. The Ziegler-Natta catalyst according to claim 1, wherein in the formula (I) n is an integer 1 to 3, all $R^1$ groups are the same or different and are hydrogen or alkyl groups of 1 to 3 carbon atoms, provided that all $R^1$ are not hydrogen, and all $R^2$ groups are the same and are alkyl groups of 1 to 2 carbon atoms.

11. The Ziegler-Natta catalyst according to claim 1, wherein the external additive is selected from the group consisting of dimethoxy(methyl)silane, dimethoxydimethylsilane and trimethoxymethylsilane.

* * * * *